United States Patent Office 3,446,825
Patented May 27, 1969

3,446,825
SUBSTITUTED pi-ALLYL PALLADIUM CHLORIDE COMPLEXES
Robert G. Schultz, St. Louis, Mo., assignor to Monsanto Company, St. Louis, Mo., a corporation of Delaware
No Drawing. Filed Apr. 18, 1966, Ser. No. 543,031
Int. Cl. C07f 15/00, 1/20
U.S. Cl. 260—429       25 Claims

ABSTRACT OF THE DISCLOSURE

The present invention relates to pi-allyl complexes, particularly palladium chloride complexes derived from olefins in the presence of a metal acetate and cupric chloride. The compounds of the invention can be used as catalysts, oil additives, gasoline additives, and antioxidants.

---

The present invention relates to pi-allyl complexes, particularly the complexes of palladium derived from various olefins. It is an object of the invention to prepare pi-allyl complexes of certain types which have not been available by prior art methods. It is also an object of the invention to provide a novel method for preparing such complexes.

The prior art methods for the synthesis of pi-allyl complexes are generally applicable only to the simpler members of a series so that in order to obtain the higher homologs, tedious synthesis steps are necessary. Furthermore, a limitation of the known methods when used to produce the present compounds is that the synthesis must begin with dienes and allenes, the use of which leads to the introduction of other functional groups such as ethers or halides introduced into the pi-allyl complex during its preparation. In addition, the known methods for the synthesis of pi-allyl complexes from olefins are specifically limited to olefins with a branching alkyl group on the double bond; this method has also been characterized by poor yields accompanied by palladium metal precipitation.

It has now been found that pi-allyl complexes of palladium may be prepared in high yield from all types of olefins, using a metal acetate-copper chloride combination with the palladium source such as palladium chloride or sodium chloropalladite, Na$_2$PdCl$_4$. The general equation for the present reaction as illustrated by butene is set forth below:

$$2C_4H_8 + 2PdCl_2 \xrightarrow[\substack{NaC_2H_3O_2 \\ CH_3-COOH}]{CuCl_2} (C_4H_7PdCl)_2 + 2HCl$$

The above equation specifically illustrates the reaction with butene as the olefinic source, although the olefins, and olefin sources are of broad scope as summarized below. An anhydrous acetic acid system is employed as the reaction medium with a metal acetate such as sodium acetate being present as a buffer. The metal acetate employed is selected from the group consisting of sodium, lithium, magnesium, calcium, barium, strontium, zinc, cadmium and aluminum acetates. It has been found that both the metal acetate and the cupric chloride are necessary for the pi-allyl complex formation since the omission of either one almost completely inhibits the reaction.

The precise mechanism of the present reaction has not been completely elucidated, but it is noteworthy that no precipitation of palladium occurs, although this is common in the previously known methods of preparation of pi-allyl complexes. The pi-allyl complexes of the present invention also constitute certain novel compounds which have different structures from those described for pi-allyl complexes obtained by previously known methods.

A generalized reaction scheme illustrative of the more complex olefins is found below, where R$_1$, R$_2$, R$_3$, R$_4$ and R$_5$ are selected from the group consisting of hydrogen, alkyl radicals having from 4 to 20 carbon atoms, and cycloalkyl and aryl radicals having from 6 to 20 carbon atoms. Typical olefins used in the preparation of the compounds of the present invention include monoolefins preferably having from 4 carbon atoms, such as butylenes, pentenes, hexenes, heptenes, octenes, nonenes, decenes, and others having up to 20 carbon atoms; aromatic olefins such as alpha and beta-methyl-styrene; and cyclic olefins such as cyclohexene, methylcyclohexene, cyclooctene, and others having up to 20 carbon atoms.

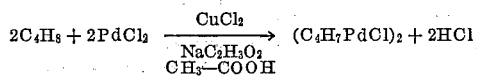

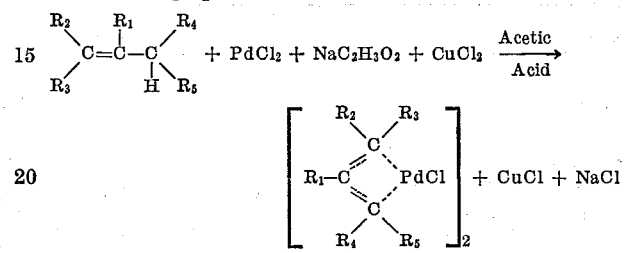

Under the conditions of the present reaction, isomerization of the olefin prior to pi-allyl complex formation is possible. However, in most cases, a single pi-allyl complex, rather than a mixture of isomers is obtained. Thus, hexene-1-, hexene-2, and hexene-3 all give di-mu-chloro-di(1-methyl-3-ethyl-pi-allyl)-di-palladium(II)(IV). The use of Roman numerals herein is for the identification of products for which characterization data is given in a separate table.

The molecular configuration of the products is determined from the nuclear magnetic resonance spectrum of the complex.

It has been found that a metal acetate selected from the group consisting of sodium, lithium, magnesium, calcium, barium, strontium, zinc, cadmium and aluminum acetates is necessarily used with cupric chloride in carrying out the present process. A ratio of the acetate ion to total chloride ion e.g. from cupric chloride and palladium chloride or sodium chloropalladite of at least 0.5 is necessary for the successful operation of the process. A preferred ratio of acetate ion to chloride ion is from 0.5 to 30 and a still more preferred range is from 0.75 to 1.25.

In addition to the critical ratio of acetate ion to total chloride ion, it has been found that it is essential to regulate the ratio of copper as cupric ion relative to the palladium present. It has been found necessary to provide a ratio of at least 4:1, a preferred range being from 4:1 to 20:1, a still more preferred range being from 5:1 to 8:1.

The chemical reaction described herein is conducted in an anhydrous acetic acid medium with the aforesaid components being dissolved or dispersed in the medium. The amount of acetic acid relative to the other components is not highly critical, but is conveniently maintained in the proportion of from 100% to 1000% by weight relative to the metal salts which are present.

The present reaction for the production of pi-allylic complexes is preferably carried out at temperatures of at least 60° C., or at a preferred range of from 80° C. to 120° C. The pressure on the system is not a critical variable so that subatmospheric, atmospheric, or superatmospheric pressures may be used as desired.

The following examples illustrate specific embodiments of the present invention:

Example 1.—Synthesis of pi-allyl palladium complex from a liquid olefin

To a mixture of 1.00 g. (5.65 millimoles) of palladium chloride, 4.57 g. (33.9 millimoles) of anhydrous cupric chloride and 6.00 g. (73.2 millimoles) of anhydrous sodium acetate is added 150 ml. of glacial acetic acid. After effecting partial solution by heating at 95° C. for 20 minutes, 10 ml. of liquid hexene-1 is added. Heating and stirring are continued for ½ to 1 hr. Over this time the reaction mixture changes in color from dark green to bluish-white. After cooling, the solids are removed by suction filtration and the yellow-green filtrate is poured into 500 ml. water. A yellow oil containing vinylation products, unreacted olefin, and pi-allyl complex forms at the surface of the solution. This oil is diluted with heptane, and the pi-allyl complex formed (yellow crystals) is filtered, washed with heptane, and air dried yielding 990 mg. (78.7%) di - mu - chloro-di-(1-methyl-3-ethyl-pi-allyl)-dipalladium (II) (IV). In cases with higher olefins, where the pi-allyl complex is too soluble to allow this method to be used, the water-acetic mixture is extracted three times with benzene and the combined benzene solutions washed with water, dilute aqueous sodium bicarbonate, and water. After drying the yellow solution over sodium sulfate, evaporation to dryness under vacuum affords the solid pi-allyl palladium complex. In those cases where solids are isolated directly from the acetic acid-water mixture, this second method is used to obtain additional pi-allyl complex. Purification is effected by recrystallization from benzene-heptane. Additional data on the specific complexes is found below in the table, which also includes NMR data of various pi-allyl complexes.

EXPERIMENTAL TABLE

| Liquid Olefin | Product | Reaction time (h.) | Yield, percent | M.P. (° C.) | Analysis |
|---|---|---|---|---|---|
| Pentene-2 | III | 1 | 57.3 | 163° (dec.) | $C_{10}H_{18}Pd_2Cl_2$ requires C, 28.46; H, 4.30; Cl, 16.80. Found: C, 28.13; H, 4.28; Cl, 16.71. |
| | | | | | $C_{12}H_{22}Pd_2Cl_2$ requires C, 32.03; H, 4.93; Cl, 15.75. |
| Hexene-1 | IV | ½ | 78.7 | 168.5–169 (dec.) | Found: C, 31.74; H, 4.95; Cl, 15.70. |
| 2-methylpentene-1 | VII | 1¼ | 51.9 | 139–140.5 | Found: C, 32.15; H, 5.01; Cl, 15.70. |
| 4-methylpentene-1 | VIII | ½ | 39.0 | 94–96 | Found: C, 32.56; H, 4.86; Cl, 15.56. |
| 2,3-dimethylbutene-1 | V | ½ | 71.0 | 166.5–168 (dec.) | Found: C, 31.97; H, 4.98; Cl, 15.43. |
| 2,3-dimethylbutene-2 | VI | ½ | 54.6 | 121–122 (dec.) | Found: C, 32.32; H, 4.96; Cl, 15.37. |
| | | | | | $C_{14}H_{26}Pd_2Cl_2$ requires C, 35.17; H, 5.48; Cl, 14.83. |
| Heptene-1 | IX | ½ | 42.7 | 137–137.5 (dec.) | Found: C, 35.48; H, 5.52; Cl, 14.80. |

NMR DATA ON PI-ALLYL COMPLEXES

| Olefin Precursor | Product | Assignment [3] | Peak (in p.p.m.) and Form and (Relative Intensity) |
|---|---|---|---|
| Butene-1 | 1-methyl-pi-allyl (II) | $R_1$=H<br>$R_2$=$R_4$=H<br>$R_3$=H<br>$R_5$=$CH_3$ | −5.45 sextet (1).<br>−4.02 complex multiplet (2).<br>−2.92 doublet (1).<br>−1.42 doublet (3). |
| Pentene-2 | 1,3-dimethyl-pi-allyl (III) | $R_1$=H<br>$R_2$=$R_4$=H<br>$R_3$=$R_5$=$CH_3$ | −5.15 triplet (1).<br>−3.65 complex multiplet (2).<br>−1.19 doublet (6). |
| Hexene-1 or Hexene-2 or Hexene-3 | 1-methyl-3-ethyl pi-allyl (IV) | $R_1$=H<br>$R_2$=$R_4$=H<br>$R_3$=$CH_3$<br>$R_5$=Et | −5.11 triplet (1).<br>−3.62 complex multiplet (2).<br>{−1.17 doublet}<br>{−1.00 triplet} (6) peaks overlap.<br>−1.48 multiplet (2). |
| 2,3-dimethyl-butene-1 | 2-isopropyl-pi-allyl (V) | $R_1$=i-Pr<br>$R_2$=$R_4$=H<br>$R_3$=$R_5$=H | −1.12 doublet (6) −2.37 pentet (1).<br>−3.80 singlet (2).<br>−2.74 singlet (2). |
| 2,3-dimethylbutene-2 | 1,1,2-trimethyl-pi-allyl (VI) | $R_1$=—$CH_3$<br>$R_2$=—$CH_3$<br>$R_4$=—H<br>$R_3$=—$CH_3$<br>$R_5$=—H | −2.01 singlet (3).<br>−1.32 singlet (3).<br>−3.67 singlet (1).<br>−1.19 singlet (3).<br>−3.12 singlet (1). |
| 2-methylpentene-1 | 2-n-propyl-pi-allyl (VII) | $R_1$=n-Pr<br><br>$R_2$=$R_4$=H<br>$R_3$=$R_5$=H | {−0.90 triplet (3).<br>{−1.52 complex multiplet (2);<br>{−2.19 triplet (2).<br>−3.74 singlet (2).<br>−2.76 singlet (2). |
| 4-methylpentene-1 or cis- or trans-4-methylpentene-2 or 2-methylpentene-2 | 1-ethyl-2-methyl-pi-allyl (VIII) | $R_1$=$CH_3$<br>$R_2$=H<br>$R_4$=H<br>$R_3$=Et<br>$R_5$=H | −1.98 singlet (3).<br>−3.48 triplet} (2) peaks overlap.<br>−3.61 singlet}<br>{−1.03 triplet (3).<br>{−1.51 multiplet (2).<br>−2.58 singlet (1). |
| Heptene-1 | 1-methyl-3-n-propyl-pi-allyl (IX) | $R_1$=H<br>$R_2$=$R_4$=H<br>$R_3$=$CH_3$<br>$R_5$=n-Pr | −5.13 triplet (1).<br>−3.68 complex multiplet (2);<br>−1.21 doublet (3).<br>{−0.93 complex multiplet (3);<br>{−1.58 complex multiplet (4). |
| Cyclohexene | Pi-cyclohexenyl (XII) | $R_1$=H<br>$R_2$=$R_4$=H<br>$R_3$—$R_5$=—$(CH_2)_3$— | −5.50 multiplet (1).<br>−5.19 multiplet (2).<br>−1.72 multiplet (6). |
| 1-methylcyclohexene | 2-methylcyclohexenyl (XIII) | $R_1$=$CH_3$<br>$R_2$=$R_4$=H<br>$R_3$—$R_5$=—$(CH_2)_3$— | −1.90 singlet (3).<br>−4.80 multiplet (2).<br>−1.70 multiplet (6). |
| 3-methylpentene-1 | 1,2,3-trimethyl-pi-allyl (X) | $R_1$=—$CH_3$<br>$R_2$=$R_4$=H<br>$R_3$=$R_5$=$CH_3$ | −1.90 singlet (3).<br>−3.45 complex multiplet.[2]<br>−1.02 complex multiplet.[1] |
| | and<br>1-methyl-2-ethyl-pi-allyl (XI)<br>Ratio of X:XI=1.4:1 | $R_1$=Et<br>$R_2$=H<br>$R_4$=H<br>$R_3$=$CH_3$<br>$R_5$=H | −1.02 complex multiplet.[1]<br>−2.15 complex multiplet (2);<br>−3.45 complex multiplet.[2]<br>−3.56 singlet.[2]<br>{−1.02 complex multiplet.[1]<br>{−2.48 singlet (1). |

[1] Peaks overlap, total intensity correct for product ratio.   [2] Peaks overlap, total intensity correct for product ratio.

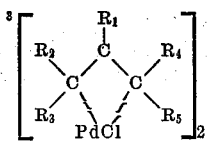

Example 2.—Di-mu-chloro-di-pi-(1-methylallyl)-di-palladium (II) (II)

To a mixture of palladium chloride (2.00 g., 11.3 millimoles), anhydrous cupric chloride (16.00 g., 119 millimoles), and anhydrous sodium acetate (12.00 g., 146 millimoles), is added 100 ml. of glacial acetic acid. After effecting partial solution by heating at 95° C. for 15 minutes, butene-1 is bubbled into the reaction mixture for 1 hr. at 90–95° C. After cooling, the solids are removed by suction filtration and the yellow-green filtrate poured into 250 ml. water. The isolation procedure is as described above in Example 1 yielding 1.01 g. (45.4%) of di - mu-chloro-di-pi-(1-methylallyl)-di-palladium(II), dec. pt. 130° C.

The compounds produced according to the present invention can be used as catalysts, oil additives, gasoline additives, antioxidants, etc., as well as organic intermediates for the product of other organic compounds.

For example, the products of the examples can be hydrolyzed to obtain saturated and unsaturated aldehydes and ketones.

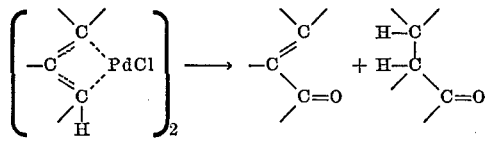

or carbonylated (with CO) to obtain beta-gamma unsaturated acid halides or esters

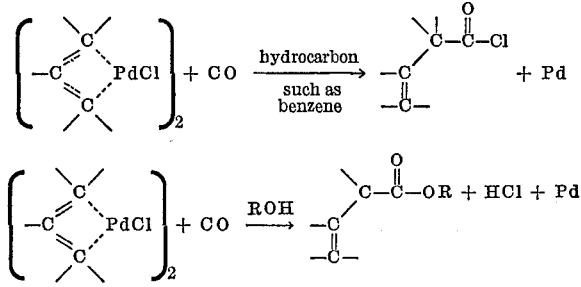

What is claimed is:

1. The process of preparing pi-allylic palladium chloride complexes which comprises contacting a monoolefin having from 4 to 20 carbon atoms with palladium chloride in the presence of sodium acetate and cupric chloride in a substantially anhydrous medium comprising anhydrous acetic acid at a temperature of at least 60° C., the ratio of acetate ion to total chloride ion being from 0.5 to 30, and the ratio of cupric ion relative to palladium being from 4:1 to 20:1.

2. A process as in claim 1 in which the olefin has the formula $CH_2=CH-R$, where R is selected from the group consisting of hydrogen, alkyl radicals having from 4 to 20 carbon atoms, and cycloalkyl and aryl radicals having from 6 to 20 carbon atoms.

3. A process as in claim 1 in which the olefin has the formula $CH_2=CRR'$, where R and R' are selected from the group consisting of hydrogen, alkyl radicals having from 4 to 20 carbon atoms, and cycloalkyl and aryl radicals having from 6 to 20 carbon atoms.

4. A process as in claim 1 in which the olefin has the formula $R-CH=CHR'$, where R and R' are selected from the group consisting of hydrogen, alkyl radicals having from 4 to 20 carbon atoms, and cycloalkyl and aryl radicals having from 6 to 20 carbon atoms.

5. A process as in claim 1 in which the olefin has the formula $RCH=CR'R''$, where R, R' and R'' are selected from the group consisting of hydrogen, alkyl radicals having from 4 to 20 carbon atoms, and cycloalkyl and aryl radicals having from 6 to 20 carbon atoms.

6. A process as in claim 1 in which the olefin has the formula $RR'C=CR''R'''$, where R, R', R'' and R''' are selected from the group consisting of hydrogen, alkyl radicals having from 4 to 20 carbon atoms, and cycloalkyl and aryl radicals having from 6 to 20 carbon atoms.

7. A process as in claim 1 in which the olefin has the formula:

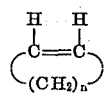

where $n$ is at least 4.

8. A process as in claim 1 in which the olefin has the formula:

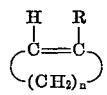

where $n$ is at least 4.

9. A process as in claim 1 in which the olefin is butene-1 and the pi-allylic complex is 1-methyl-pi-allyl.

10. A process as in claim 1 in which the olefin is pentene-2 and the pi-allylic complex is 1,3-dimethyl-pi-allyl.

11. A process as in claim 1 in which the olefin is hexene-1, and the pi-allylic complex is 1-methyl-3-ethyl-pi-allyl.

12. A process as in claim 1 in which the olefin is hexene-2, and the pi-allylic complex is 1-methyl-3-ethyl-pi-allyl.

13. A process as in claim 1 in which the olefin is hexene-3, and the pi-allylic complex is 1-methyl-3-ethyl-pi-allyl.

14. A process is in claim 1 in which the olefin is 2,3-dimethylbutene-1, and the pi-allylic complex is 2-isopropyl-pi-allyl.

15. A process as in claim 1 in which the olefin is 2,3-dimethylbutene-2, and the pi-allylic complex is 1,1,2-trimethyl-pi-allyl.

16. A process as in claim 1 in which the olefin is 2-methylpentene-1, and the pi-allylic complex is 2-n-propyl-pi-allyl.

17. A process as in claim 1 in which the olefin is 2-methylpentene-2, and the pi-allylic complex is 1-ethyl-2-methyl-pi-allyl.

18. A process as in claim 1 in which the olefin is 4-methylpentene-1, and the pi-allylic complex is 1-ethyl-2-methyl-pi-allyl.

19. A process as in claim 1 in which the olefin is 4-methylpentene-2, and the pi-allylic complex is 1-ethyl-2-methyl-pi-allyl.

20. A process as in claim 1 in which the olefin is heptene-1, and the pi-allylic complex is 1-methyl-3-n-propyl-pi-allyl.

21. A process as in claim 1 in which the olefin is 3-methylpentene-1, and the pi-allylic complex is a mixture of 1,2,3-trimethyl-pi-allyl and 1-methyl-2-ethyl-pi-allyl in a ratio of 1.4:1.

22. A process as in claim 1 in which the olefin is cyclohexene, and the pi-allylic complex is pi-cyclohexenyl.

23. A process as in claim 1 in which the olefin is 1-methylcyclohexene, and the pi-allylic complex is 2-methyl-pi-cyclohexenyl.

24. The process of preparing pi-allylic complexes of palladium which comprises contacting a monoolefin having from 4 to 20 carbon atoms with a palladium source, in the presence of cupric chloride, and a metal acetate selected from the group consisting of sodium, lithium, magnesium, calcium, barium, strontium, zinc, cadmium and aluminum acetates, in a substantially anhydrous medium comprising anhydrous acetic acid at a temperature of at least 60° C., the ratio of acetate ion to total chloride ion being from 0.5 to 30, and the ratio of cupric ion relative to palladium being from 4:1 to 20:1.

25. The process of preparing pi-allylic complexes of palladium which comprises contacting a monoolefin having from 4 to 20 carbon atoms with a palladium source selected from the group consisting of palladium chloride and sodium chloropalladite, in the presence of cupric chloride, and a metal acetate selected from the group consisting of sodium, lithium, magnesium, calcium, barium, strontium, zinc, cadmium and aluminum acetates, in a substantially anhydrous medium comprising anhydrous acetic acid at a temperature of at least 60° C., the ratio of acetate ion to total chloride ion being from 0.5 to 30, and the ratio of cupric ion relative to palladium being from 4:1 to 20:1.

References Cited

FOREIGN PATENTS 1,190,939    4/1965    Germany.
1,197,453    7/1965    Germany.

OTHER REFERENCES

Hüttel et al.: Ber. 97 (1964), pp. 1439–41 and 1446–9.

TOBIAS E. LEVOW, *Primary Examiner.*

A. P. DEMERS, *Assistant Examiner.*

U.S. Cl. X.R.

44—68; 252—49.7, 400, 429, 431; 260—468, 544, 597, 598, 599, 604